June 12, 1962    J. A. GAYLORD    3,038,472
SEPARABLE CONNECTION DEVICE FOR SURVIVAL KITS
Filed Aug. 12, 1957    4 Sheets-Sheet 1
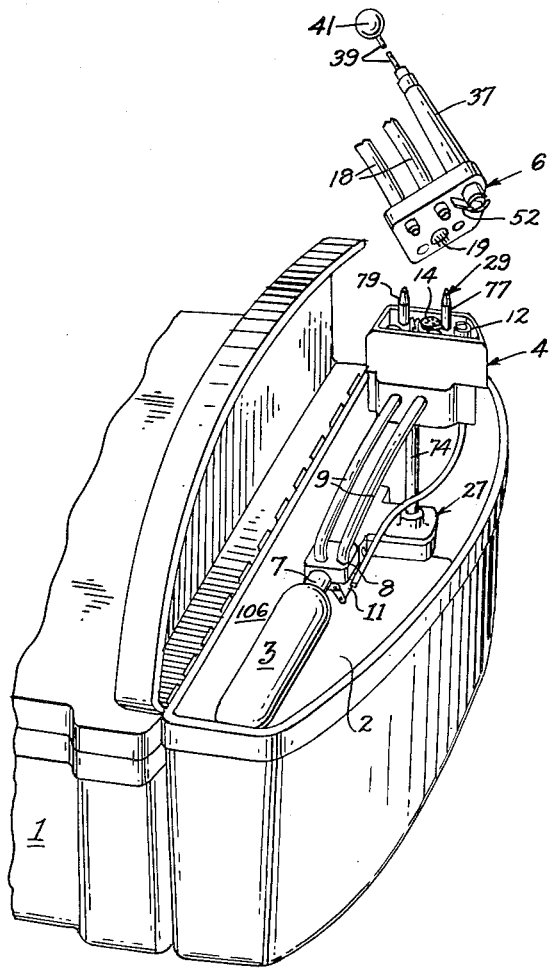
Fig.1.
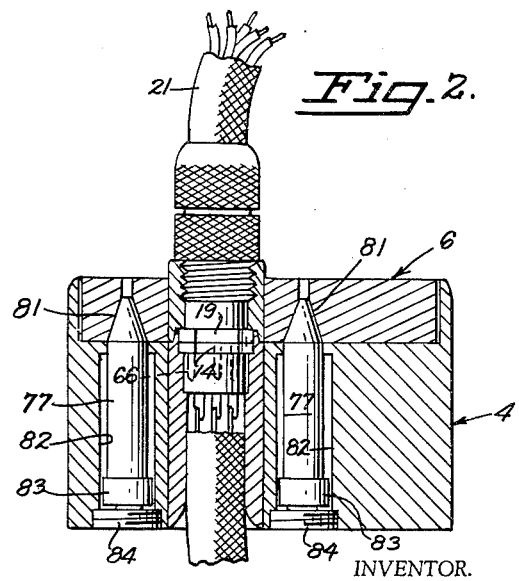
INVENTOR.
JOHN A. GAYLORD
BY George B. White
ATTORNEY.

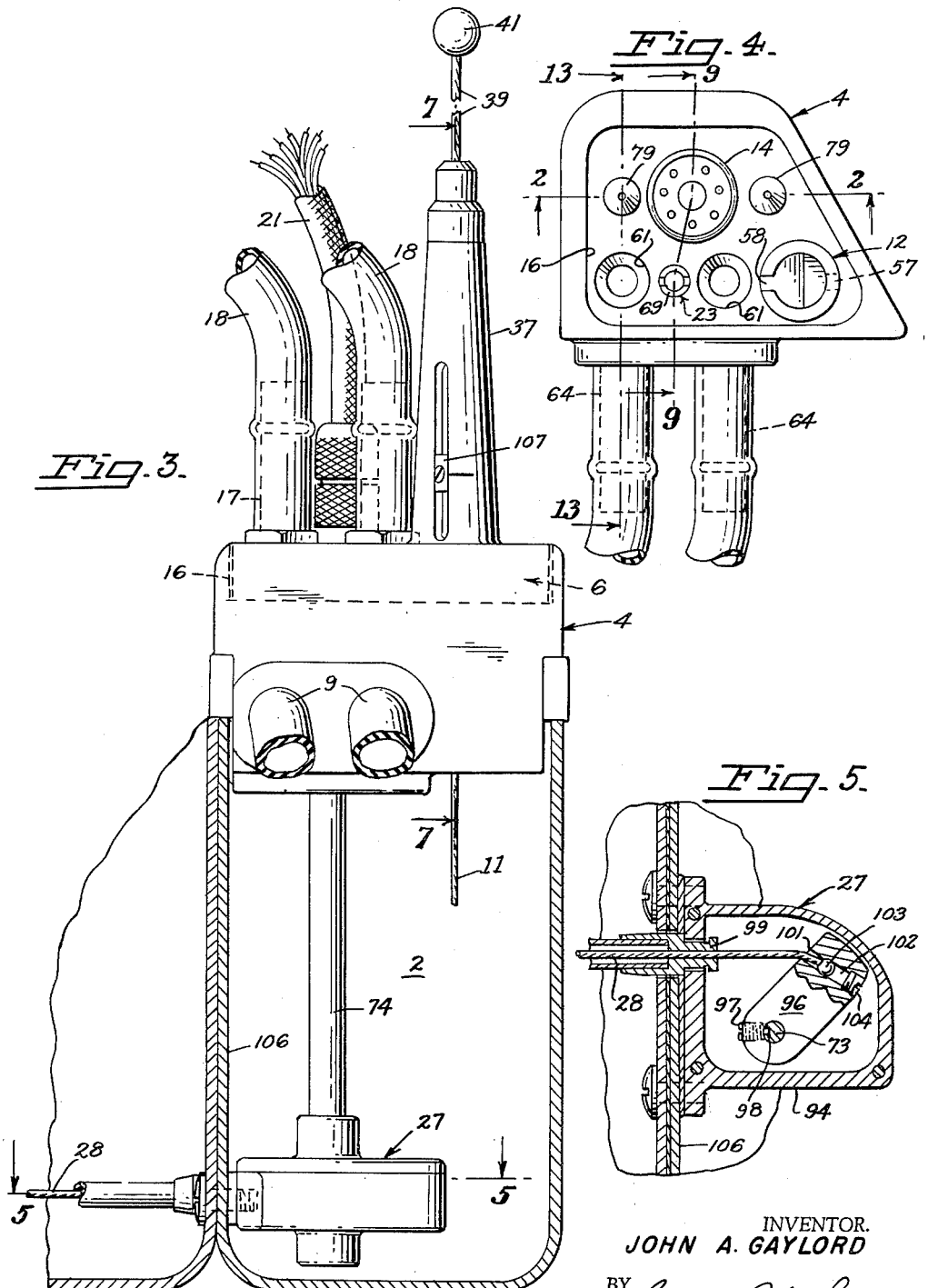

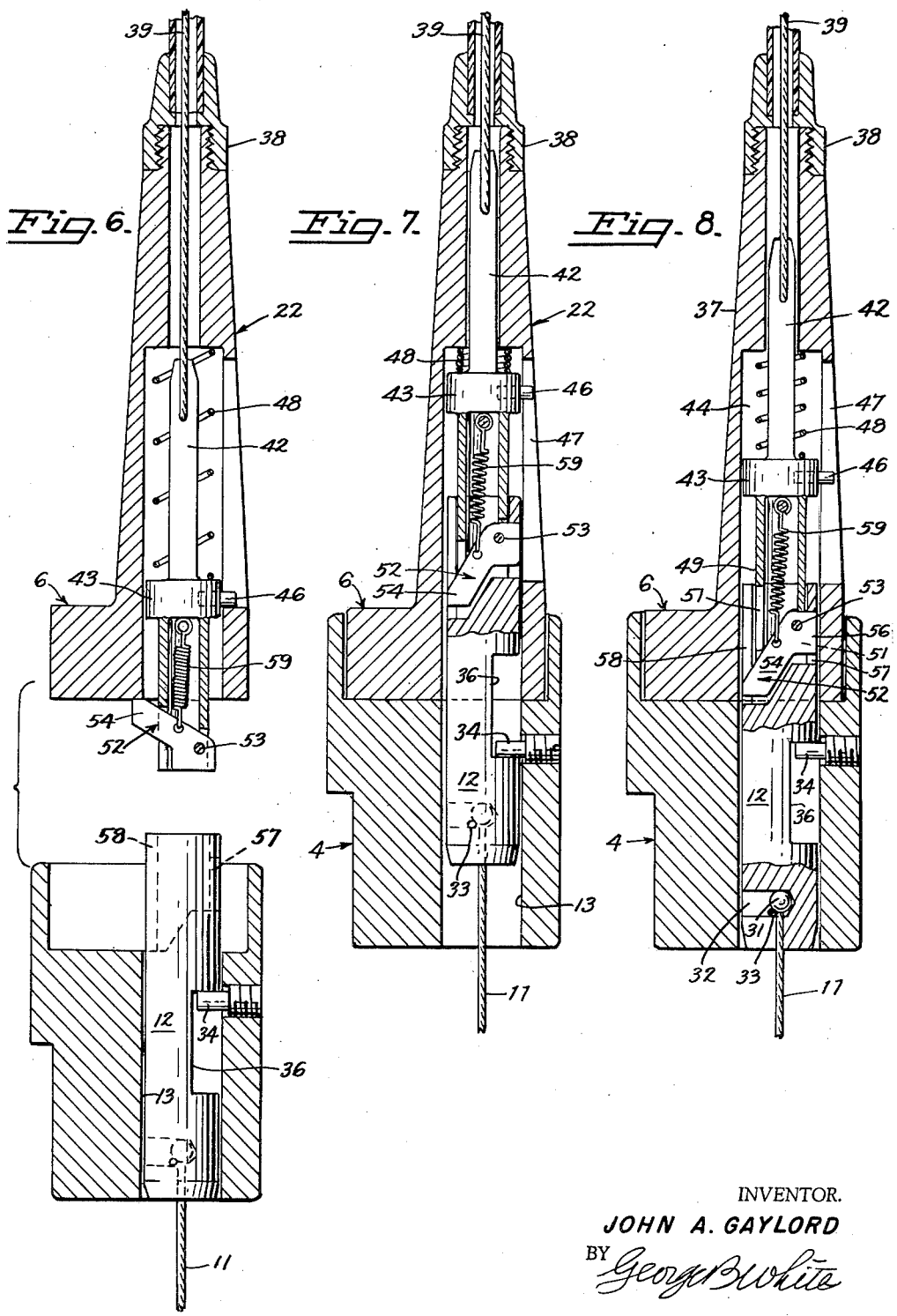

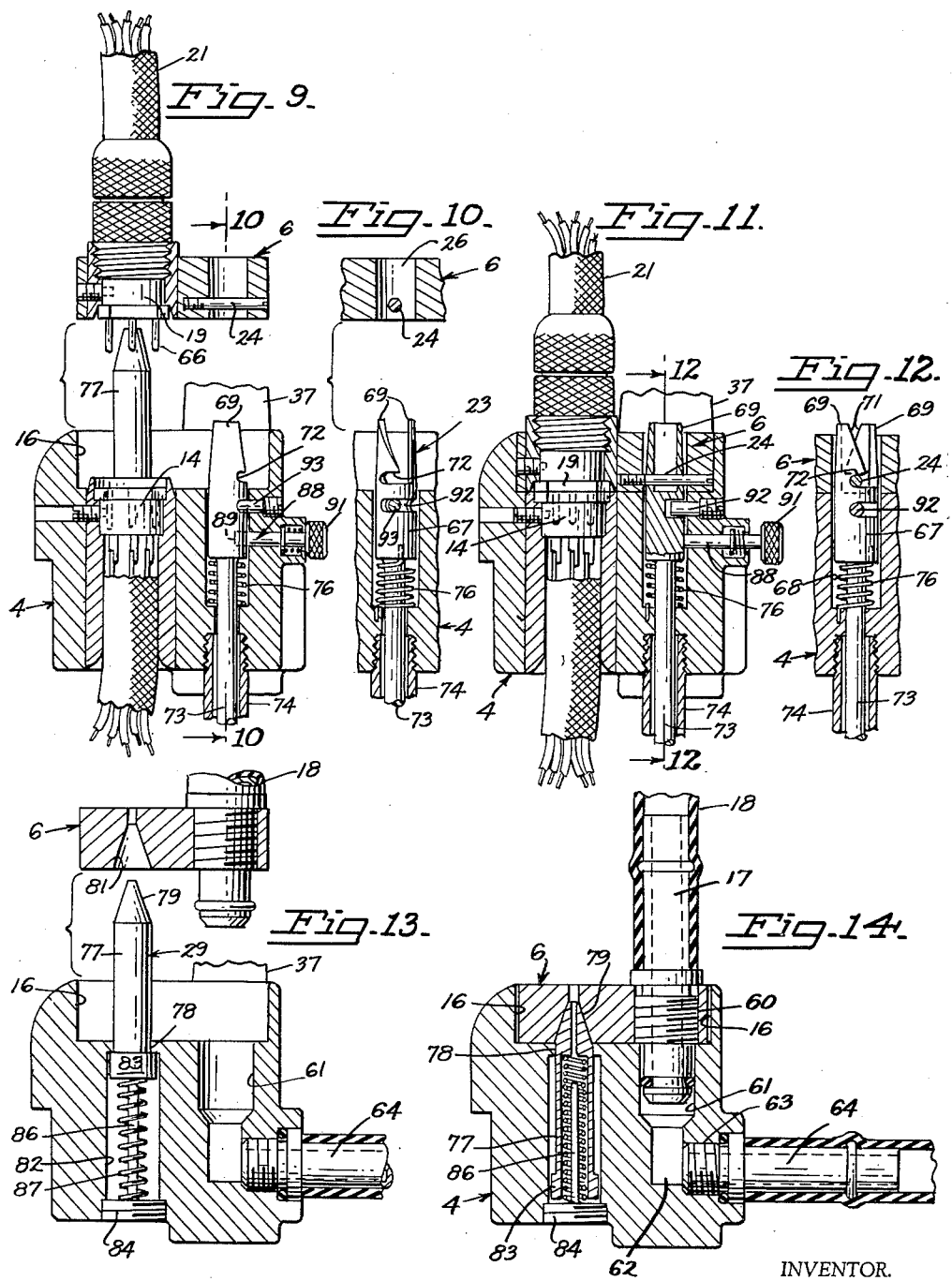

United States Patent Office 3,038,472
Patented June 12, 1962

3,038,472
SEPARABLE CONNECTION DEVICE FOR SURVIVAL KITS
John A. Gaylord, San Rafael, Calif., assignor to H. Koch & Sons, Corte Madera, Calif., a partnership
Filed Aug. 12, 1957, Ser. No. 677,548
14 Claims. (Cl. 128—203)

This invention relates to separable connection device for survival kits.

It is of utmost importance to the survival and safety of aircraft personnel to be able to release a so called survival kit quickly without fumbling or delay and without breaking certain conduits and lines. The general structure and operation of such survival kits is shown in copending application of Joe B. Smith and John A. Gaylord entitled Survival Kits for Flight Personnel, Serial No. 670,477, filed July 8, 1957, now Patent No. 2,992,798.

In the casing of such a survival kit is provided radio equipment and also one or more bottles of compressed oxygen. Electric control conduits must extend from the equipment to the person and also conduits must convey the oxygen to the breathing mask and to the pressurized garment of the person so as to be quickly applied in emergency. But when the person wants to drop the kit or wants to leave the kit, the electric wiring connection and tube connections from the person to the kit must be quickly and automatically severed, yet other times such connections must form an operating unit.

An object of my invention is to provide a separable connection block for survival kits which block has devices to establish continuous operative electrical connections, oxygen conduits, and oxygen valve manipulation when in place, but which devices are automatically severable when the block is severed from the kit or vice versa; means being provided to release said block simultaneously with the release of the kit suspending connections; an illustration of the latter being shown and described in my copending application of John A. Gaylord for Releasable Suspension Lock for Aerial Survivor Kits, Serial No. 677,690, filed August 12, 1957, and now Patent No. 2,994,552.

I am aware that some changes may be made in the general arrangements and combinations of the several devices and parts, as well as in the details of the construction thereof without departing from the scope of the present invention as set forth in the following specification, and as defined in the following claims; hence I do not limit my invention to the exact arrangements and combinations of the said device and parts as described in the said specification, nor do I confine myself to the exact details of the construction of the said parts as illustrated in the accompanying drawings.

With the foregoing and other objects in view, which will be made manifest in the following detailed description, reference is had to the accompanying drawings for the illustrative embodiment of the invention, wherein:

FIG. 1 is a perspective fragmental view of the end of a survival kit casing where the compartment is for the oxygen bottles, the lid being open and showing the fixed socket and the releasable plug severed.

FIG. 2 is a sectional view of the fixed socket and plug connected, the section being taken substantially on the line 2—2 of FIG. 4, showing the electrical plug connection and the ejectors.

FIG. 3 is a fragmental—partly sectional view of an end of the casing compartment holding the fixed socket and plug together.

FIG. 4 is a detail top plan view of the fixed socket, with the plug removed.

FIG. 5 is a fragmental sectional view taken on lines 5—5 of FIG. 3, showing the release actuating crank arm.

FIG. 6 is a sectional view of the fixed socket and plug in severed position, the section being taken through the valve opening pulling device.

FIG. 7 is a sectional view of the fixed socket and plug with the pulling device pulled up to open the oxygen valve, the section being taken substantially on lines 7—7 of FIG. 3.

FIG. 8 is a sectional view similar to FIG. 7, with the pull line in initial position before the valve opening.

FIG. 9 is a partly sectional view of the severed fixed socket and plug taken on lines 9—9 of FIG. 4, the boss for the line pulling device being broken off.

FIG. 10 is a sectional view through the lock in the fixed socket, the section being taken substantially on the line 10—10 of FIG. 9.

FIG. 11 is a sectional view similar to FIG. 9, the plug being shown locked into the fixed socket.

FIG. 12 is a sectional view of the lock taken substantially on the lines 12—12 of FIG. 11.

FIG. 13 is a sectional view of the severed fixed socket and plug substantially on the lines 13—13 of FIG. 4, and FIG. 14 is a sectional view similar to FIG. 13, the plug being shown locked in the fixed socket.

As shown in FIG. 1 the survival kit has a casing 1 which has at one end a separate compartment 2, in which latter is contained radio equipment and one or more containers or bottles 3 to contain compressed oxygen. One end of the compartment 2 is covered by a fixed socket 4 to accommodate fixed connecting parts and to receive a multiple plug 6 to carry the separable parts of connections to the various devices in the compartment 2.

The oxygen bottle 3 is provided with a usual pressure reducing valve 7, and a manifold 8 connected by conduits 9 to the socket 4. The valve 7, indicated diagrammatically, is opened by the pulling of a line 11, which line also extends to the socket 4 and is anchored in a plunger 12 reciprocable in a hole 13 vertically through the socket 4. The socket 4 also has in it separable electrical terminal socket 14.

The plug 6 is formed of a single block conforming in outline to the contour of a recess 16 in the top of the socket 4. This plug 6 has thereon a pair of tube connections 17 from which lead tubes 18 respectively to the breathing mask and inflatable garment of the person.

The plug 6 also has an electrical plug 19 to plug into the electrical socket 14. This electrical plug 19 is provided with terminals for an electrical conduit 21 leading to a remote control by the operator person.

The plug 6 also has on it a pulling mechanism 22 severably connected to the plunger 12 for pulling the line 11 for opening the oxygen valve 7.

The socket has a double bayonet lock 23 rotatable for engagement by a cross lock pin 24 in a passage 26 in the plug 6 for locking the plug 6 to the socket 4. A releasing device 27 in the compartment 2 is operated by a pull line 28 remotely for turning the bayonet lock 23 so as to release the pin 24 and permit the withdrawal of the plug 6 from the socket recess 16. A pair of spring loaded ejectors 29 in the socket 4 bear against the plug 6 so as to urge the plug 6 out of the recess 16 when the lock is released. The pair of ejectors 29 coact with the peculiar irregular outline of the recess to definitely locate the plug 6 everytime in the correct position for the various severable connections.

The pulling mechanism 22 is used for turning "on" the oxygen valve 7. The line 11 has a ball 31 which is held in a pocket 32 in the bottom of the plunger 12 by a cross pin 33, so that when the plunger 12 is pulled up in the hole 13 it pulls the line 11 and opens the valve 7. The reciprocation of the plunger 12 is limited by a limit pin 34 extended into a slot 36 in the side of the plunger 12.

An upwardly tapering tubular boss 37 extends outwardly from the top of the plug 6. Through a threaded cap 38 on the top of this boss 37 extends a manipulating line 39 with a grip ball 41 on its end, whereby the person can pull the mechanism to open the oxygen valve 7. The lower or inner end of the manipulating line 39 is secured to the stem 42 of a pulling head 43 reciprocal in an enlarged pocket 44 in the lower portion of the boss 37. A set screw 46 extended from the pulling head 43 into a longitudinal slot 47 in a side of the boss 37 prevents the turning of the pulling head 43. A light coil spring 48 around the stem 42 between the end of the pocket 44 and the pulling head 43 normally urges the pulling head 43 toward the fixed socket 4.

From the pulling head 43 extends toward the fixed socket 4 a cylindrical body 49 which has diametrically opposite longitudinal slots 51. Near the lower end of the body 49 is a dog 52 held by a transverse pivot 53, so that the arm 54 of the dog 52 projects beyond the lower end of the body 49, while the catch 56 of the dog 52 projects through the side slot 51 of the body 49. The cylindrical body 49 telescopes partly into the tubular top of the plunger 12, which latter has a keeper hole 57 on the same side where the catch 56 is located so as to be engageable by said catch 56. The pins 34 and 46 respectively hold the plunger 12 and the cylindrical body 49 and the catch 56 in alignment. The dog arm 54 extends through an end slot or open slot 58 through the side at the top of the plunger 12. A coil spring 59 anchored in the cylindrical body is connected to the arm 54 so as to pull the arm normally upwardly and inwardly of said cylindrical body 49 and thus to swing the catch 56 downwardly and out of the keeper hole 57 when the arm 54 is not restrained by the wall of the enlarged pocket 44.

Thus the cylindrical body 49 is coupled to the plunger 12 by the dog 52, and whenever the grip ball 41 and the line 39 are pulled the plunger 12 and the valve line 11 are pulled thereby. When the plug 6 is released, in a manner to be hereinafter described, on first separation of the plug 6 from the recess 16 the plunger 12 pulls the cylindrical body 49 out of the boss pocket 44 thus freeing the arm 54 of the dog 52 so as to permit it to be swung upwardly by its spring 59 and thereby to withdraw the catch 56 from the keeper hole 57. When the plug 6 is replaced in position the arm 54 enters the top slot 58 of the plunger 12 and as the plug 6 is pressed in place the wall of the boss pocket 44 forces the arm 54 to turn inwardly of the plunger 12 and thus to turn the catch 56 into the keeper hole 57 for coupling the cylindrical body 49 and the plunger 12 together.

The tube connections 17 are threaded in holes 60 in the plug 6, and the inner ends thereof telescope into outlet holes 61 of a chamber 62 in the socket 4, into the intake holes 63 of which chamber 62 are threaded the conduit connections 64. These connections are suitably packed.

The electrical plug 19 has suitable prongs 66 to make contact for all lines in the electric socket 14, and is suitably mounted in the plug 6 so as to pull out with the plug 6 when the latter is released and withdrawn.

The locking of the double bayonet lock 23 with the lock pin 24 is accomplished by turning of the lock 23 as the passage 26 of the plug 6 is pushed over it and the lock pin 24 is forced into it. This lock 23 has a generally cylindrical base 67 journalled in a hole 68 in the fixed socket 4. From this base 67 projects upwardly, and beyond the top of the socket 4, a tapered head divided in two prongs 69 by oppositely slanting curved axial slot 71 diametrically across between the prongs 69. The lower ends of the entry slots 71 are offset oppositely to the incline of the respective slanting wall of the entry slot so as to form keeper bayonet slots 72.

A stem 73 extends from the lock base 67 into a guide tube 74 secured in the bottom of the fixed socket 4. A torsion spring 76 around the stem 73 is anchored at one end thereof in the bottom of the lock hole 68 and at its top end in the bottom of the lock base 67 offset from the center thereof so as to urge the lock 23 to turn into locking position. When the lock pin 24 is forced between the prongs 69 it exerts vertical axial pressure on the slanting or cam sides of the entry slots 71 and forces the lock 23 to turn against the action of the torsion spring 76 until the lockpin 24 reaches the offset keeper bayonet slots 72, whereupon the torsion spring 76 snaps the lock 23 so as to snap the keeper bayonet slots 72 over the lock pin 24 and lock it in position. When the releasing device 27 is actuated it turns the lock 23 again against the action of the torsion spring 76 until the keeper bayonet slots 76 are withdrawn from the lock pin 24 whereupon the plug 6 is ejected from the recess 16 by the ejectors 29.

Each ejector 29 includes a cylindrical hollow plunger 77 slidable through a slot 78 through the top of the fixed socket 4. The plunger 77 terminates in a conical solid tip 79 which protrudes into a registering conical pocket 81 in the bottom of the plug 6. The counter bore 82 under the hole 78 accommodates a base flange 83 around the plunger 77 to limit the outward stroke of the plunger 77 and to retain it in the socket 4. A threaded plug 84 is screwed in the lower end of the counter bore 82 and has a stem 86 extended into the hollow interior of the plunger 77. A coil spring 87 surrounds said stem inside said plunger 77 and bears against said threaded plug 84 at one end and against the base of the tip 79 at its upper end so as to urge said ejector plunger 77 upwardly and thus tend to push the plug 6 away from the fixed socket 4. Thus when the plug 6 is released from the lock 23 and two ejectors 29 push the plug out of the recess 16 to accelerate and assure disengagement.

In order to prevent the lock 23 to lock over the lockpin 24 before the latter had a chance to escape, for instance if the plug 6 is held down or sticks for some reason, a spring loaded catch pin 88 in the side of the socket 4 engages a hole 89 in the side of the lock base 67 and holds the lock 23 in plug releasing position. The head 91 of this catch pin 88 is accessible from the outside of the socket 4 so that it may be pulled out manually and thereby to permit the returning of the lock 23 by the torsion spring 76 into locking position.

The lock base 67 has an arcuate groove 92 around a part of its periphery riding on a set screw 93 so as to hold the lock 23 in its elevated position.

The lock releasing device includes a housing 94 on the lower end of the guide tube 74 in which housing the lower end of the stem 73 is journalled. On the portion of the stem 73 within the housing 94 is mounted a crank arm 96 by means of a set screw 97, which set screw 97 projects into a keyway 98 on the stem 73. The pull line 28 extends through a bushing 99 into the housing 94 and through a hole 101 in the free end of the crank arm 96 into a pocket 102 and is held in said pocket 102 by an anchor ball 103. The pocket 102 is plugged by a suitable threaded plug 104. The housing 94 is suitably attached to the adjacent wall 106 of the compartment 2.

In operation the person places the kit into the seat under him, and puts on his mask, and connects his mask and garment by the tubes 18 to the tube connections 17 of the plug 6. The person also makes suitable connection to the electric conduit 21. The kit suspension straps are connected by releasable suspension plugs described in said copending applications. When the person is ejected or bails out of the aircraft in an emergency, he pulls the grip ball 41 and line 39 thereby pulls the plunger 12 and line 11 and opens the oxygen valve 7. Oxygen flows through the reducing valve 7, manifold 8 and conduit 9 into the chamber 62 in the fixed socket 4 and then out through the tube connections 17 and tubes 18 to the mask and inflatable garment of the operator person. This operation may be needed also within the aircraft in case of failure of cabin pressure.

As the person reaches a certain altitude he opens his parachute. After further descent to a suitable altitude the operator releases the survival kit, as described in my said copending applications, by pulling a handle, whereupon the kit falls away from the operator so as to be suspended at a predetermined distance below him. The operation of the release handle pulls simultaneously several actuating lines for actuating various releasing mechanisms. One of the lines so pulled is the pull line 28 of the releasing device 22. The pulling of pull line 28 turns the crank arm 96 which latter turns the stem 73 and the lock 23 in a contraclockwise direction viewing FIGS. 5 and 9, thereby releasing the lockpin 24 and permitting the ejectors 29 to push the plug 6 away from the socket recess 16. As the kit drops away, the fixed socket 4 drops with it. The plunger 12, being coupled with the cylindrical body 49 is pulled up slightly to the top of its stroke and then as the plug 6 is held, the cylindrical body 49 is pulled out of the plug pocket 44 freeing the dog arm 54 and allowing it to be turned outwardly by the spring 59 thereby disengaging the catch 56 from the keeper hole 57 of the plunger 12 so as to permit the plunger 12 to drop with the kit. The electrical plug 19 also is pulled free, as well as the oxygen tube connections 17. The catch pin 88 snaps into the hole 89 so as to hold the lock 23 in lockpin releasing position, so as to prevent the relocking of the plug 6, in the event the plug 6 sticks or is unexpectedly held by some weight in the socket recess 16. This permits the manual forcing of the plug 6 out of said recess 16. If the plug is to be reinserted in the recess 16, then the lock 23 is "cocked" by pulling catch 88 out of the hole 89, whereupon the torsion spring 76 again acts on the lock 23 as heretofore described and the catch pin 88 is held out until after the plug 6 and its lockpin 24 are again locked in the socket 4.

For further safety an indicator mark 107 on the tubular boss 37 aligns with the set screw 46 when the dog 52 is properly coupled with the plunger 12. If the dog 52 does not catch properly then it pushes the cylindrical body 49 upwardly in the pocket 44 and the set screw 46 will appear above the indicator mark 107 indicating to the operator that his pull line to the oxygen valve is not properly coupled and thus permit him to readjust the plug 6 accordingly.

The device is positive in operation, and offers additional safety in the use of survival kits in situations where fractions of a second may mean the difference between safety or destruction of a person.

I claim:

1. In a separable connecting device in combination with a releasable survival kit and conduit elements leading from said kit; a fixed socket in said survival kit, fixed terminal connections for conduits in said socket, a multiple connection plug fitting into said socket, complemental connections on said plug to engage said terminal connections to form continuous conduits, a lock member extended from said socket into said plug, an interlocking element in said plug to interengage with said lock member so as to lock said plug into said socket, a releasing device to operate said lock member for releasing said interlocking element and said plug from said socket, and an actuator device to actuate said releasing device.

2. In a separable connecting device in combination with a releasable survival kit and conduit elements leading from said kit; a fixed socket in said survival kit, fixed terminal connections for conduits in said socket, a multiple connection plug fitting into said socket, complemental connections on said plug to engage said terminal connections to form continuous conduits, a lock member extended from said socket into said plug, said lock member including a base rotatable in a hole through said socket, spaced opposed prongs extended from said base toward said plug, inclined cam sides on said walls forming portions of bayonet slot respectively, the bottom of each slot being offset to form the locking part of the bayonet slot, yieldable means to turn said lock member into locking position, said plug having a pocket therein fitting over said lock member, a cross pin across said pocket adapted to enter between said prongs and acting on said cam sides for turning said lock member to permit insertion of said cross pin into said bayonet slots, yieldable means normally to urge said lock into locking position, a line actuated means to turn said lock member to releasing position, and a line for turning said lock member into cross pin releasing position.

3. In a separable connecting device in combination with a releasable survival kit and conduit elements leading from said kit; a fixed socket in said survival kit, fixed terminal connections for conduits in said socket, a multiple connection plug fitting into said socket, complemental connections on said plug to engage said terminal connections to form continuous conduits, a lock member extended from said socket into said plug, said lock member including a base rotatable in a hole through said socket, spaced opposed prongs extended from said base toward said plug, inclined cam sides on said walls forming portions of bayonet slot respectively, the bottom of each slot being offset to form the locking part of the bayonet slot, yieldable means to turn said lock member into locking position, said plug having a pocket therein fitting over said lock member, a cross pin across said pocket adapted to enter between said prongs and acting on said cam sides for turning said lock member to permit insertion of said cross pin into said bayonet slots, yieldable means normally to urge said lock into locking position, a line for turning said lock member into cross pin releasing position, and a manually releasable catch in said socket to catch and hold said lock member in said cross pin releasing position until manually released.

4. In a severable connection device in combination with an aerial survival kit having therein a container for compressed oxygen and a normally closed valve for suitably releasing said oxygen into a conduit; a fixed socket on the kit, said conduit being connected to said socket, a plug fitting into said socket, complemental conduit elements on said plug and socket to form a continuous conduit for conducting said oxygen when the plug is inserted in the socket, a pulling device for opening said oxygen valve including a plunger reciprocable in said socket, a pull line anchored in said plunger and connected to said oxygen valve to open the latter when pulled by the plunger, a reciprocable element in said plug aligned with said plunger for engagement, a manipulating line extended into said plug and connected to said reciprocable element to pull the latter, means to couple said reciprocable element and said plunger so as to transmit pull therethrough for opening said oxygen valve, and means to automatically disengage said coupling means when said plug and socket are severed from one another.

5. In a severable connection device in combination with an aerial survival kit having therein a container for compressed oxygen and a normally closed valve for suitably releasing said oxygen into a conduit; a fixed socket on the kit, said conduit being connected to said socket, a plug fitting into said socket, complemental conduit elements on said plug and socket to form a continuous conduit for conducting said oxygen when the plug is inserted in the socket, a pulling device for opening said oxygen valve including a plunger reciprocable in said socket, a pull line anchored in said plunger and connected to said oxygen valve to open the latter when pulled by the plunger, a reciprocable element in said plug aligned with said plunger, a dog on said reciprocable element adapted to engage said plunger so as to couple said element and said plunger, a manipulating line connected to said reciprocable element to impart a pull to the same, yieldable means to normally urge said dog into disengaged position from said plunger, and means on the plunger to move said dog into plunger engaging position as the plug is inserted into the fixed socket.

6. In a severable connection device in combination with an aerial survival kit having therein a container for compressed oxygen and a normally closed valve for suitably releasing said oxygen into a conduit; a fixed socket on the kit, said conduit being connected to said socket, a plug fitting into said socket, complemental conduit elements on said plug and socket to form a continuous conduit for conducting said oxygen when the plug is inserted in the socket, a pulling device for opening said oxygen valve including a plunger reciprocable in said socket, a pull line anchored in said plunger and connected to said oxygen valve to open the latter when pulled by the plunger, a reciprocable element in said plug aligned with said plunger, a dog on said reciprocable element adapted to engage said plunger so as to couple said element and said plunger, a manipulating line connected to said reciprocable element to impart a pull to the same, yieldable means to normally urge said dog into disengaged position from said plunger, and means on the plunger to move said dog into plunger engaging position as the plug is inserted into the fixed socket, and means to maintain said reciprocable element and said plunger respectively in said plug and in said fixed socket in registering positions.

7. In a severable connection device in combination with an aerial survival kit having therein a container for compressed oxygen and a normally closed valve for suitably releasing said oxygen into a conduit; a fixed socket on the kit, said conduit being connected to said socket, a plug fitting into said socket, complemental conduit elements on said plug and socket to form a continuous conduit for conducting said oxygen when the plug is inserted in the socket, a pulling device for opening said oxygen valve including a plunger reciprocable in said socket, a pull line anchored in said plunger and connected to said oxygen valve to open the latter when pulled by the plunger, a reciprocable element in said plug aligned with said plunger, a dog on said reciprocable element adapted to engage said plunger so as to couple said element and said plunger, a manipulating line connected to said reciprocable element to impart a pull to the same, yieldable means to normally urge said dog into disengaged position from said plunger, and means on the plunger to move said dog into plunger engaging position as the plug is inserted into the fixed socket, and indicator means on the plug coacting with said reciprocable element to indicate the correct plunger engaging position of said reciprocable element.

8. In a severable connection device in combination with an aerial survival kit having therein a container for compressed oxygen and a normally closed valve for suitably releasing said oxygen into a conduit; a fixed socket on the kit, said conduit being connected to said socket, a plug fitting into said socket, complemental conduit elements on said plug and socket to form a continuous conduit for conducting said oxygen when the plug is inserted in the socket, a pulling device for opening said oxygen valve including a plunger reciprocable in said socket, a pull line anchored in said plunger and connected to said oxygen valve to open the latter when pulled by the plunger, said plug having a pocket therein axially aligned with said plunger, a reciprocable element in said pocket, a manipulating pull line connected to said reciprocable element, a dog transversely pivoted in the end of said reciprocable element adjacent said plunger, said plunger having a keeper hole in its end adjacent said plug engageable by said dog, a spring in said reciprocable element normally to urge said dog out of engagement from said keeper hole, an arm on said dog bearing against an edge of said passage to be pushed thereby to turn said dog into said keeper hole when said reciprocable element abuts said plunger and the plug is pushed thereover into said socket and to be swung by said spring outwardly of said keeper hole when said plug is withdrawn from said socket and is relatively pulled off said end of said reciprocable element.

9. In a severable connection device in combination with an aerial survival kit having therein a container for compressed oxygen and a normally closed valve for suitably releasing said oxygen into a conduit; a fixed socket on the kit, said conduit being connected to said socket, a plug fitting into said socket, complemental conduit elements on said plug and socket to form a continuous conduit for conducting said oxygen when the plug is inserted in the socket, a pulling device for opening said oxygen valve including a plunger reciprocable in said socket, a pull line anchored in said plunger and connected to said oxygen valve to open the latter when pulled by the plunger, said plug having a pocket therein axially aligned with said plunger, a reciprocable element in said pocket, a manipulating pull line connected to said reciprocable element, a dog transversely pivoted in the end of said reciprocable element adjacent said plunger, said plunger having a keeper hole in its end adjacent said plug engageable by said dog, a spring in said reciprocable element normally to urge said dog out of engagement from said keeper hole, an arm on said dog bearing against an edge of said passage to be pushed thereby to turn said dog into said keeper hole when said reciprocable element abuts said plunger and the plug is pushed thereover into said socket and to be swung by said spring outwardly of said keeper hole when said plug is withdrawn from said socket and is relatively pulled off said end of said reciprocable element, and means to maintain said reciprocable element and said plunger respectively in said plug and in said fixed socket in registering positions.

10. In a severable connection device in combination with an aerial survival kit having therein a container for compressed oxygen and a normally closed valve for releasing said oxygen into a delivery conduit; a fixed socket on the kit, said socket having passages therethrough connected to said conduit, a plug fitting into said fixed socket, conduit connections on said plug adapted to be connected to said socket passages so as to conduct oxygen therefrom, valve actuating means extended through said plug and said socket to said valve to open said valve at will, severable connection device between portions of said valve actuating means in said plug and in said socket, the contours of said socket and of said plug coacting to automatically register said conduit connection and said severable portions of the valve actuating means when said plug is inserted in said socket.

11. In a severable connection device in combination with an aerial survival kit having therein a container for compressed oxygen and a normally closed valve for releasing said oxygen into a delivery conduit; a fixed socket on the kit, said socket having passages therethrough connected to said conduit, a plug fitting into said fixed socket, conduit connections on said plug adapted to be connected to said socket passages so as to conduit oxygen therefrom, valve actuating means extended through said plug and said socket to said valve to open said valve at will, severable connection device between portions of said valve actuating means in said plug and in said socket, the contours of said socket and of said plug coacting to automatically register said conduit connection and said severable portions of the valve actuating means when said plug is inserted in said socket, and a pair of spring loaded ejector elements in said fixed socket, coacting means on said plug to be engaged by the respective ejector elements when the plug is in place so as to locate the plug in said socket and coact with said ejector elements to urge the plug out of said socket, and releasable interlocking means to hold said plug in place in said socket.

12. In a severable connection device in combination with an aerial survival kit having therein a container for compressed oxygen and a normally closed valve for releasing said oxygen into a delivery conduit; a fixed socket on the kit, said socket having passages therethrough connected to said conduit, a plug fitting into said fixed socket, conduit connections on said plug adapted to be connected to said socket passages so as to conduct oxygen therefrom, valve actuating means extended through said plug and said socket to said valve to open said valve at will, severable connection device between portions of said valve actuating means in said plug and in said socket, the contours of said socket and of said plug coacting to automatically register said conduit connection and said severable portions of the valve actuating means when said plug is inserted in said socket, said severable connection device including aligned reciprocable elements in said socket and in said plug respectively connected to said valve and to a manipulating line, releasable coupling means between said reciprocable elements, and means actuated by relative movement of said plug and fixed socket to release said coupling means when the plug and socket are separated and to connect said coupling means when said plug and socket are coupled together.

13. In a severable connection device in combination with an aerial survival kit having therein a container for compressed oxygen and a normally closed valve for releasing said oxygen into a delivery conduit; a fixed socket on the kit, said socket having passages therethrough connected to said conduit, a plug fitting into said fixed socket, conduit connections on said plug adapted to be connected to said socket passages so as to conduct oxygen therefrom, valve actuating means extended through said plug and said socket to said valve to open said valve at will, severable connection device between portions of said valve actuating means in said plug and in said socket, the contours of said socket and of said plug coacting to automatically register said conduit connection and said severable portions of the valve actuating means when said plug is inserted in said socket, and a pair of spring loaded ejector elements in said fixed socket, coacting means on said plug to be engaged by the respective ejector elements when the plug is in place so as to locate the plug in said socket and coact with said ejector elements to urge the plug out of said socket, and releasable interlocking means to hold said plug in place in said socket, releasing means for said survival kit, and means actuating in synchronism with said kit releasing means to release said interlocking means.

14. In a severable connection device in combination with an aerial survival kit having therein a container for compressed oxygen and a normally closed valve for releasing said oxygen into a delivery conduit; a fixed socket on the kit, said socket having passages therethrough connected to said conduit, a plug fitting into said fixed socket, conduit connections on said plug adapted to be connected to said socket passages so as to conduct oxygen therefrom, valve actuating means extended through said plug and said socket to said valve to open said valve at will, severable connection device between portions of said valve actuating means in said plug and in said socket, the contours of said socket and of said plug coacting to automatically register said conduit connection and said severable portions of the valve actuating means when said plug is inserted in said socket, said severable connection device including aligned reciprocable elements in said socket and in said plug respectively connected to said valve and to a manipulating line, releasable coupling means between said reciprocable elements, and means actuated by relative movement of said plug and fixed socket to release said coupling means when the plug and socket are separated and to connect said coupling means when said plug and socket are coupled together, releasing means for said survival kit, and means actuating in synchronism with said kit releasing means to release said interlocking means.

References Cited in the file of this patent

UNITED STATES PATENTS

| 2,307,393 | Crowley | Jan. 5, 1943 |
| 2,510,125 | Meakin | June 6, 1950 |
| 2,835,251 | Oliveau | May 20, 1958 |

FOREIGN PATENTS

| 591,704 | Great Britain | Aug. 26, 1947 |